(12) United States Patent
Yoon (10) Patent No.: US 12,555,877 B2
(45) Date of Patent: Feb. 17, 2026

(54) BATTERY PACK AND DEVICE INCLUDING THE SAME

(71) Applicant: LG ENERGY SOLUTION, LTD., Seoul (KR)

(72) Inventor: Doohan Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 515 days.

(21) Appl. No.: 18/019,749

(22) PCT Filed: Apr. 4, 2022

(86) PCT No.: PCT/KR2022/004762
§ 371 (c)(1),
(2) Date: Feb. 3, 2023

(87) PCT Pub. No.: WO2022/231152
PCT Pub. Date: Nov. 3, 2022

(65) Prior Publication Data
US 2023/0291082 A1 Sep. 14, 2023

(30) Foreign Application Priority Data
Apr. 30, 2021 (KR) ........................ 10-2021-0056634

(51) Int. Cl.
*H01M 50/581* (2021.01)
*H01M 50/583* (2021.01)
*H01M 50/588* (2021.01)

(52) U.S. Cl.
CPC ....... *H01M 50/581* (2021.01); *H01M 50/583* (2021.01); *H01M 50/588* (2021.01)

(58) Field of Classification Search
CPC ............. H01M 50/581; H01M 50/583; H01M 50/588; H01M 10/647; H01M 10/613;
(Continued)

(56) References Cited

U.S. PATENT DOCUMENTS

| 4,007,315 A | 2/1977 | Brinkmann et al. |
| 2010/0026242 A1 | 2/2010 | Forslow |

(Continued)

FOREIGN PATENT DOCUMENTS

| CN | 101626918 A | 1/2010 |
| CN | 108140793 A | 6/2018 |

(Continued)

OTHER PUBLICATIONS

Gomez, WO-2011157954-A1, Espacenet machine translation, 2011 (Year: 2011).*

(Continued)

*Primary Examiner* — Adam A Arciero
(74) *Attorney, Agent, or Firm* — Birch, Stewart, Kolasch & Birch, LLP (57) ABSTRACT

A battery pack includes a battery module in which a plurality of battery cells are mounted; and a discharge member electrically connected to the battery module, wherein the discharge member comprises a frame member having an open upper portion and containing a coolant, an upper cover for covering the upper portion of the frame member, and a resistor mounted in the frame member, and wherein both ends of the resistor are exposed to the outside of the discharge member, and are electrically connected to the battery module.

13 Claims, 6 Drawing Sheets

(58) Field of Classification Search
CPC ........... H01M 10/654; H01M 10/6556; H01M 10/6567; H01M 10/443; H01M 10/667; H01M 10/425; H01M 10/441; H01G 11/10; H01G 11/82; H01G 11/18; H01C 1/08; H01C 3/06; H01C 3/10; H01C 3/14; H01C 1/082; Y02E 60/10; H02J 7/00309; H02J 7/0042
See application file for complete search history.

(56) References Cited

U.S. PATENT DOCUMENTS

| | | | |
|---|---|---|---|
| 2013/0089755 | A1 | 4/2013 | Park et al. |
| 2013/0120103 | A1 | 5/2013 | Nazzaro |
| 2015/0303528 | A1 | 10/2015 | Wu |
| 2015/0348731 | A1 | 12/2015 | Douglass et al. |
| 2015/0348732 | A1 | 12/2015 | Douglass et al. |
| 2017/0098874 | A1 | 4/2017 | Shen et al. |
| 2017/0200991 | A1 | 7/2017 | Nam et al. |
| 2017/0221610 | A1 | 8/2017 | Morico et al. |
| 2019/0074557 | A1 | 3/2019 | Shin et al. |
| 2021/0242548 | A1 | 8/2021 | Lee et al. |
| 2022/0247049 | A1 | 8/2022 | Kim et al. |
| 2022/0285802 | A1* | 9/2022 | Yoo .................... H01M 10/613 |
| 2024/0304919 | A1 | 9/2024 | Yoo et al. |

FOREIGN PATENT DOCUMENTS

| | | |
|---|---|---|
| CN | 112103424 A | 12/2020 |
| CN | 112106228 A | 12/2020 |
| DE | 10 2010 064 596 B3 | 11/2015 |
| FR | 3 023 364 A1 | 1/2016 |
| GB | 2478547 A | 9/2011 |
| JP | 11-162449 A | 6/1999 |
| JP | 2010-515406 A | 5/2010 |
| JP | 2011-23179 A | 2/2011 |
| JP | 2014-62826 A | 4/2014 |
| JP | 5651334 B2 | 1/2015 |
| JP | 2015-207552 A | 11/2015 |
| JP | 6002787 B2 | 10/2016 |
| JP | 2019-506009 A | 2/2019 |
| JP | 2019-46707 A | 3/2019 |
| KR | 10-2013-0039290 A | 4/2013 |
| KR | 10-2015-0115402 A | 10/2015 |
| KR | 10-2017-0007318 A | 1/2017 |
| KR | 10-2017-0009963 A | 1/2017 |
| KR | 10-2018-0033729 A | 4/2018 |
| KR | 10-1857676 B1 | 5/2018 |
| KR | 10-2020-0141425 A | 12/2020 |
| KR | 10-2021-0006571 A | 1/2021 |
| KR | 10-2021-0007243 A | 1/2021 |
| KR | 10-2021-0008742 A | 1/2021 |
| KR | 10-2021-0046404 A | 4/2021 |
| WO | WO-2011157954 A1 * | 12/2011 .......... H01M 50/296 |
| WO | WO 2016/001418 A1 | 1/2016 |
| WO | WO-2021006586 A1 * | 1/2021 .......... H01M 50/581 |

OTHER PUBLICATIONS

International Search Report (PCT/ISA/210) issued in PCT/KR2022/004762 mailed on Aug. 5, 2022.
Extended European Search Report for European Application No. 22795986.3, dated Jan. 23, 2024.

* cited by examiner

BATTERY PACK AND DEVICE INCLUDING THE SAME

TECHNICAL FIELD

Cross Citation with Related Application(s)

This application claims the benefit of Korean Patent Application No. 10-2021-0056634 filed on Apr. 30, 2021 with the Korean Intellectual Property Office, the content of which is incorporated herein by reference in its entirety.

The present disclosure relates to a battery pack and a device including the same, and more particularly, to a battery pack that prevents self-heat generation of the battery module and a device including the same.

BACKGROUND

Along with the technology development and increased demand for mobile devices, demand for secondary batteries as energy sources has been increasing rapidly. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

Small-sized mobile devices use one or several battery cells for each device, whereas middle or large-sized devices such as vehicles require high power and large capacity. Therefore, a middle or large-sized battery module having a plurality of battery cells electrically connected to one another is used.

The middle or large-sized battery module is preferably manufactured so as to have as small a size and weight as possible. Consequently, a prismatic battery, a pouch-shaped battery or the like, which can be stacked with high integration and has a small weight relative to capacity, is mainly used as a battery cell of the middle or large-sized battery module.

However, the battery pack of the conventional technique includes a plurality of battery modules, and if a thermal runaway occurs in a part of the battery cells of each battery module to cause ignition or explosion, heat or flame may be transferred to the adjacent secondary battery to cause a secondary explosion or the like. Therefore, more efforts are being made to prevent secondary ignition or explosion.

Therefore, there is a need to develop a battery pack and a device including the same which can prevent heat generation of a battery module on a heat transfer path when heat is transferred to adjacent battery modules at the time of ignition or explosion in a part of the battery modules in the battery pack.

DETAILED DESCRIPTION OF THE INVENTION

Technical Problem

It is an object of the present disclosure to provide a battery pack that prevents self-heat generation of the battery module and a device including the same.

The objects of the present disclosure are not limited to the aforementioned objects, and other objects which are not described herein should be clearly understood by those skilled in the art from the following detailed description and the accompanying drawings.

Technical Solution

According to one embodiment of the present disclosure, there is provided a battery pack comprising: a battery module in which a plurality of battery cells are mounted; and a discharge member electrically connected to the battery module, wherein the discharge member comprises a frame member having an open upper portion and containing a coolant, an upper cover for covering the upper portion of the frame member, and a resistor mounted in the frame member, wherein ends of the resistor are exposed outside of the discharge member, and are electrically connected to the battery module.

The resistor may be bent at least twice in the frame member.

The resistor includes a busbar and an insulating layer, and the insulating layer may be formed on an outer surface of the busbar.

The central portion of the resistor may be formed with an insulating layer on the outer surface of the busbar, and end of the resistor may be formed with a power connection part in which an outer surface of the busbar is exposed.

The busbar may be made of copper (Cu) having a resistance of 3 m$\Omega$ or more to 50 m$\Omega$ or less.

The upper cover may have a first hole and a second hole formed therein, and
ends of the resistor pass through the first hole and the second hole, respectively, and are exposed to the outside.

The first hole and the second hole may be respectively formed on sides of the upper cover.

The upper cover may be formed with a third hole that can be opened and closed.

The discharge member may be configured such that the coolant is injected into the frame member through the third hole.

The discharge member may be configured such that water vapor formed by heat generation of the resistor is discharged through the third hole.

The coolant may be water.

The discharge member includes a first discharge member and a second discharge member, and the first discharge member and the second discharge member may be connected to each other in parallel.

The discharge member includes a first discharge member and a second discharge member, and the first discharge member and the second discharge member may be connected to each other in series.

According to another embodiment of the present disclosure, there is provided a device comprising the above-mentioned battery pack.

Advantageous Effects

According to embodiments, a battery pack and a device including the same of the present disclosure includes a discharge member electrically connected to the battery module and thus can prevent self-heat generation of the battery module.

The effects of the present disclosure are not limited to the effects mentioned above and additional other effects not described above will be clearly understood from the description of the appended claims by those skilled in the art.

DETAILED DESCRIPTION OF THE EMBODIMENTS

Hereinafter, various embodiments of the present disclosure will be described in detail with reference to the accompanying drawings so that those skilled in the art can easily carry out them. The present disclosure can be modified in various different ways, and is not limited to the embodiments set forth herein.

Portions that are irrelevant to the description will be omitted to clearly describe the present disclosure, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

Further, throughout the description, when a portion is referred to as "including" or "comprising" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

Figure 1:
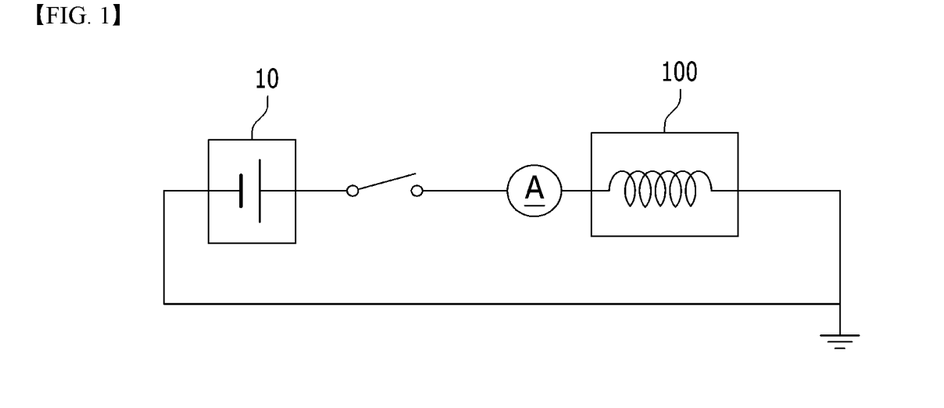
FIG. 1 is a schematic diagram which shows a circuit of a battery pack according to an embodiment of the present disclosure.

FIG. 1 is a schematic diagram which shows a circuit of a battery pack according to an embodiment of the present disclosure.

Referring to FIG. 1, a battery pack according to an embodiment of the present disclosure may include a battery module 10 in which a plurality of battery cells are mounted; and a discharge member 100 electrically connected to the battery module 10.

Here, the battery module 10 is not specifically shown in the figure, but it may be configured such that a plurality of battery cells (not shown) are stacked in a predetermined direction and then mounted on a module frame (not shown). Here, the plurality of the battery cells (not shown) is not particularly limited to the type thereof, and thus may be a pouch-type secondary battery or a prismatic secondary battery, but the pouch-type secondary battery is preferred.

Thereby, in the present embodiment, when a part of battery modules ignite or explode, the battery cells (not shown) in the adjacent battery module 10 are discharged through the discharge member 100, which can suppress the temperature rise of the battery module 10.

Below, the discharge member 100 will be described in more detail.

Figure 2:
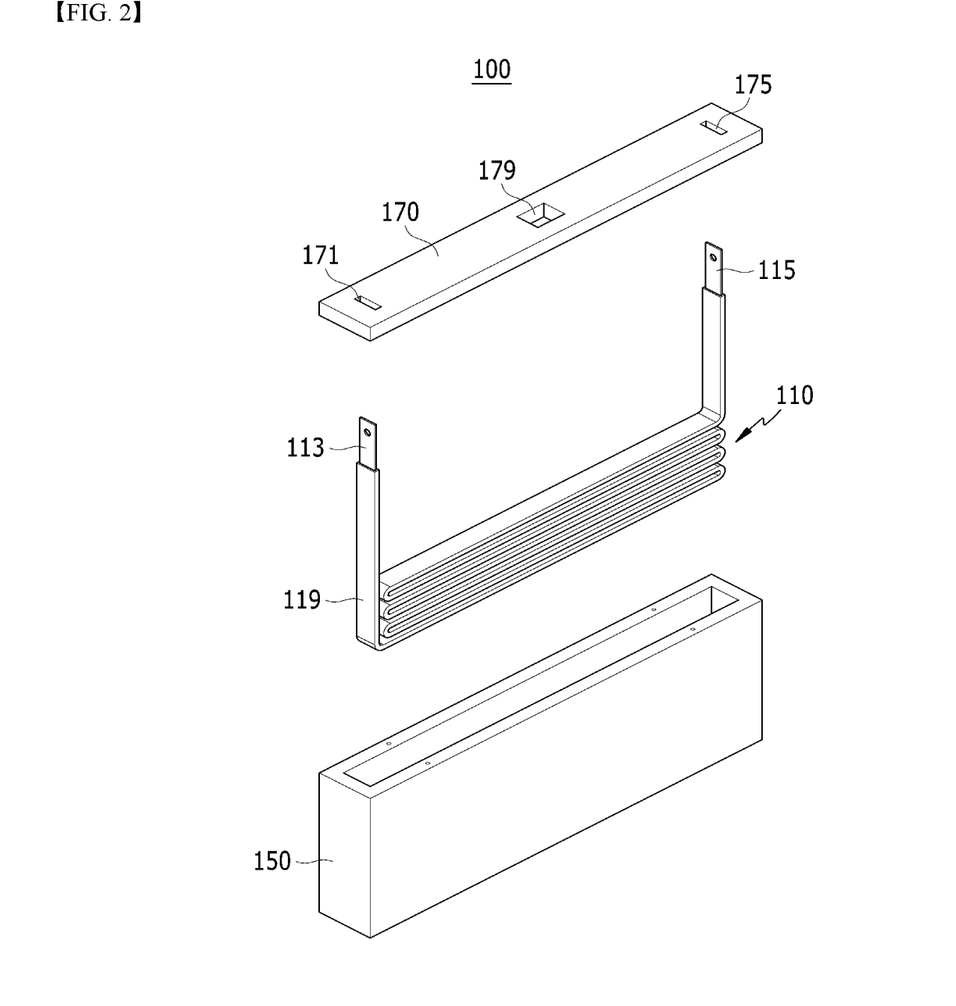
FIG. 2 is an exploded perspective view of a discharge member included in the battery pack of FIG. 1.
Figure 3:
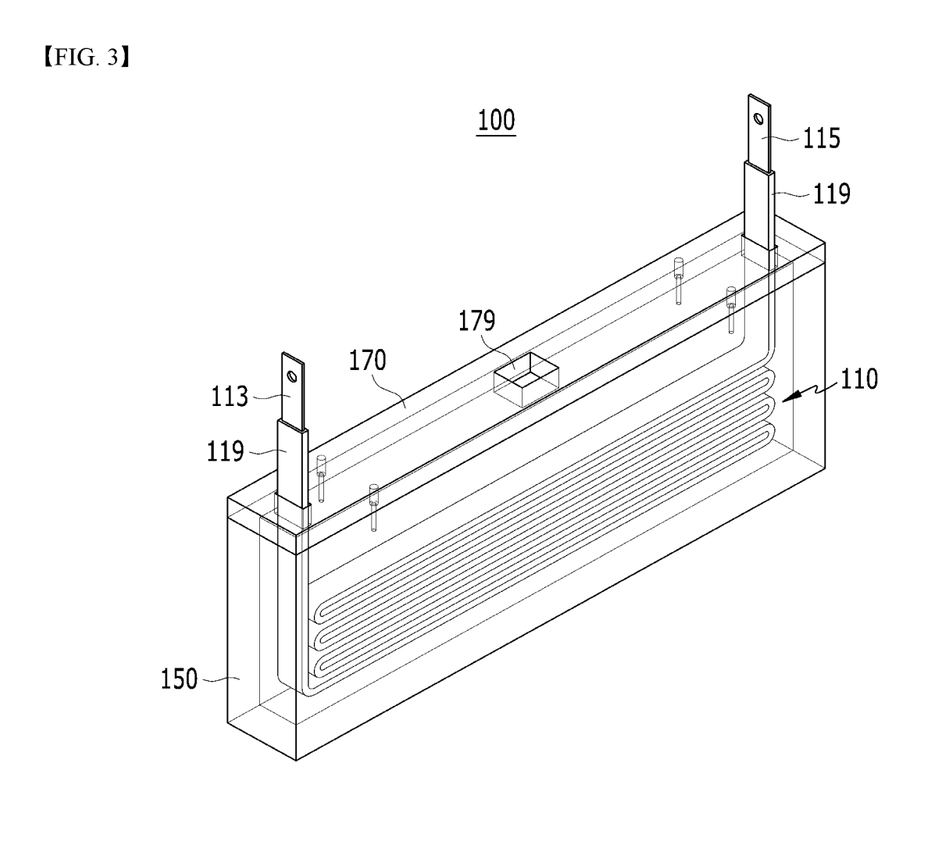
FIG. 3 is a perspective view of the discharge member of FIG. 2.

FIG. 2 is an exploded perspective view of a discharge member included in the battery pack of FIG. 1. FIG. 3 is a perspective view of the discharge member of FIG. 2.

Referring to FIGS. 2 and 3, in one embodiment of the present disclosure, the discharge member 100 includes a frame member 150 having an open upper portion and containing a coolant, an upper cover 170 for covering the upper portion of the frame member 150, and a resistor 110 mounted in the frame member 150, wherein both ends of the resistor 110 are exposed to the outside of the discharge member 100, and are electrically connected to the battery module 10.

Here, the frame member 150 and the upper cover 170 may be coupled to each other. As an example, the surfaces of the frame member 150 and the upper cover 170 that contact each other may be coupled together by a method such as welding. However, the present disclosure is not limited thereto, and any method that can stably couple and fix the frame member 150 and the upper cover 170 to each other can be included in the present embodiment.

As an example, the frame member 150 and the upper cover 170 may be made of a material such as plastic or metal. Thereby, the frame member 150 and the upper cover 170 are made of the above-mentioned material, and thus can minimize the influence from ignition or flame generated in a part of the battery modules 10 in the battery pack.

Further, the upper cover 170 may have a first hole 171 and a second hole 175 formed therein, respectively. More specifically, both ends of the resistor 110 mounted within the frame member 150 may be exposed to the outside through the first hole 171 and the second hole 175, respectively. Here, the first hole 171 and the second hole 175 may have a size equal to or larger than the cross-sectional area of the resistor 110.

As an example, the first hole 171 and the second hole 175 may be respectively formed on both sides of the upper cover 170. However, the positions of the first hole 171 and the second hole 175 are not limited thereto, and the first hole 171 and the second hole 175 may be formed at various positions.

Thereby, in the discharge member 100, both ends of the resistor 110 are exposed to the outside through the first hole 171 and the second hole 175, respectively, whereby the discharge member 100 can be easily electrically connected to the battery module 10. In addition, the upper cover 170 may be formed with a third hole 179 that can be opened and closed. Here, the discharge member 100 may be configured such that the coolant is injected into the frame member 150 through the third hole 179. The discharge member 100 may be configured that water vapor formed by heat generation of the resistor 110 is discharged through the third hole 179. More specifically, the discharge member 100 may be configured such that a coolant is injected into the frame member 150 through the third hole 179, and then seal the third hole 179. As an example, the coolant may be a cooling water. Further, the discharge member 100 may be configured such that the third hole 179 is opened when the resistor 110 generates heat.

In other words, after the coolant is injected through the third hole 179 of the upper cover 170, the third hole 179 may be normally sealed. However, when resistance heat generation occurs in the resistor 110 in the frame member 150, the third hole 179 may be opened, and water vapor generated by resistance heat generation of the resistor 110 may be discharged to the outside of the discharge member 100.

As an example, the third hole 179 may be formed in the central portion of the upper cover 170. In other words, the third hole 179 may be located between the first hole 171 and the second hole 175. However, the position of the third hole 179 is not limited thereto, and the third hole 179 may be formed at various positions.

Thereby, in the discharge member 100, the third hole 179 may be opened and closed in some cases, which may have an advantage that the sealing property of the discharge member 100 can be improved and the safety can also be improved.

Figure 4:
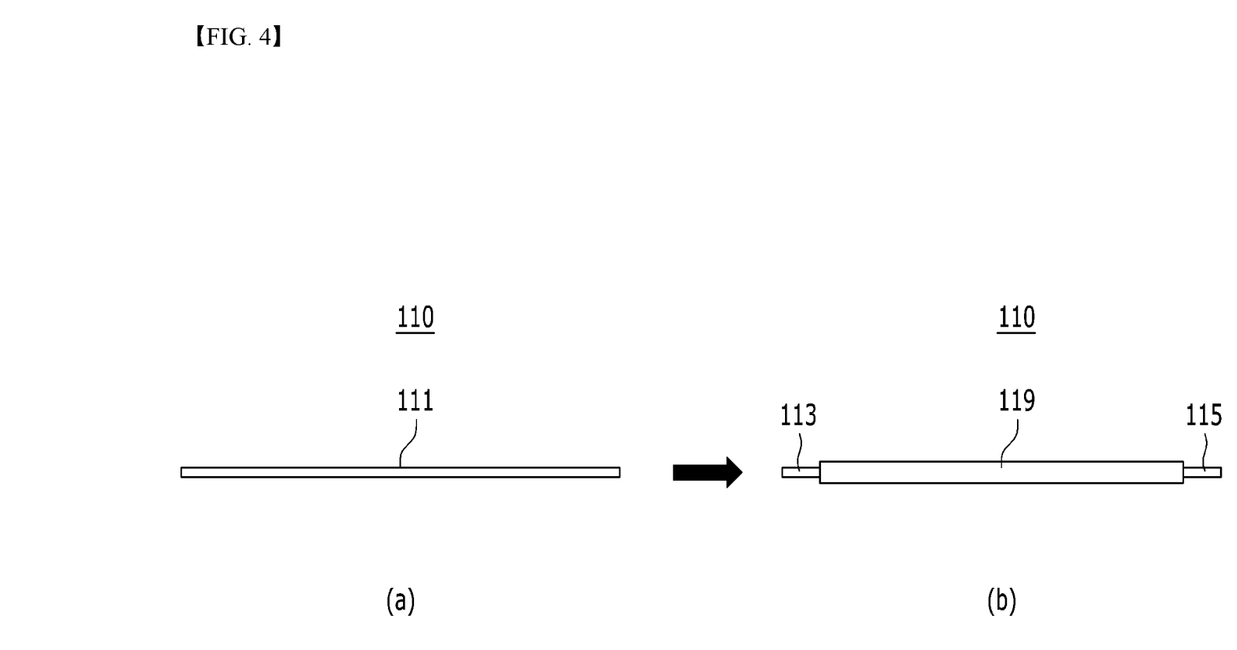
FIG. 4 is a diagram which shows a resistor included in the discharge member of FIG. 2.

FIG. 4 is a diagram which shows a resistor included in the discharge member of FIG. 2.

Referring to FIG. 4, the resistor 110 may include a busbar 111 and an insulating layer 119. More specifically, on the outer surface of the busbar 111 extending in one direction as shown in FIG. 4(a), an insulating layer 119 may be formed as shown in FIG. 4(b).

Here, the central portion of the resistor 110 is formed with an insulating layer 119 on the outer surface of the busbar 111, and the end of the resistor 110 may be formed with power connection parts 113 and 115 in which the outer surface of the busbar 111 is exposed. In addition, the power connection parts 113 and 115 may be electrically connected to the battery module, respectively.

Thereby, in the present embodiment, due to the insulating layer 119 formed on the outer surface of the resistor 110, the busbar 111 and the coolant inside the frame member 150 do not make direct contact with each other, thereby capable of preventing the occurrence of a short phenomenon between the busbar 111 and the coolant.

As an example, the insulating layer 119 may be made of a material such as general rubber, silicone, or tape. However, the present disclosure is not limited thereto, and any material capable of preventing a short phenomenon between the coolant in the frame member 150 and the resistor 110 can be included in the present embodiment.

Further, the central portion of the resistor 110 may be located in the frame member 150, but may be submerged in the coolant contained within the frame member 150. More specifically, the resistor 110 may be submerged in the coolant contained within the frame member 150 except for the power connection parts 113 and 115.

Thereby, the central portion of the resistor 110 is submerged in the coolant in the frame member 150, so that heat occurred by resistance heat generation in the resistor 110 may be cooled by the coolant. That is, even when resistance heat generation occurs in the resistor 110, the resistor 110 is cooled by the coolant, so that the energization performance of the resistor 110 and the discharge performance of the battery module 10 can be improved.

Referring to FIGS. 3 and 4, the resistor 110 can be bent at least twice in the frame member 150. More specifically, the resistor 110 can be bent multiple times in accordance with the size corresponding to the internal size of the frame member 150. Here, the resistor 110 can be bent multiple times in an S-shape. As an example, the resistor 110 can be a flexible busbar.

Thereby, in the present embodiment, the discharge member 100 includes the resistor 110 having a small cross-sectional area, but can include the resistor 110 having a relatively long length, thereby providing the advantage of having a compact size while reducing the resistance of the resistor 110.

Further, the busbar 111 included in the resistor 110 may be made of copper (Cu) having a resistance of 3 mΩ or more to 50 mΩ or less. More specifically, the busbar 111 may be made of copper (Cu) having a resistance of 3.5 mΩ or more to 47.5 mΩ or less. As an example, the busbar 111 may be made of copper (Cu) having a resistance of 4 mΩ or more and 45 mΩ or less.

Thereby, the resistor 110 includes a busbar 111 made of copper having a resistance in the above-mentioned range, and thus can sufficiently secure the energization performance while maintaining a compact size.

Unlike the same, when the resistor 110 includes the busbar 111 made of copper having a resistance of less than 3 mΩ, there is a problem that the resistance value is very small and thus the manufacturing process is not easy. In addition, when the resistor 110 includes a busbar 111 made of copper having a resistance of more than 50 mΩ, there is a problem that the discharge speed may be too slow, and as the size of the resistor 110 becomes relatively large, the space efficiency of the discharge member 100 is reduced.

Figure 5:
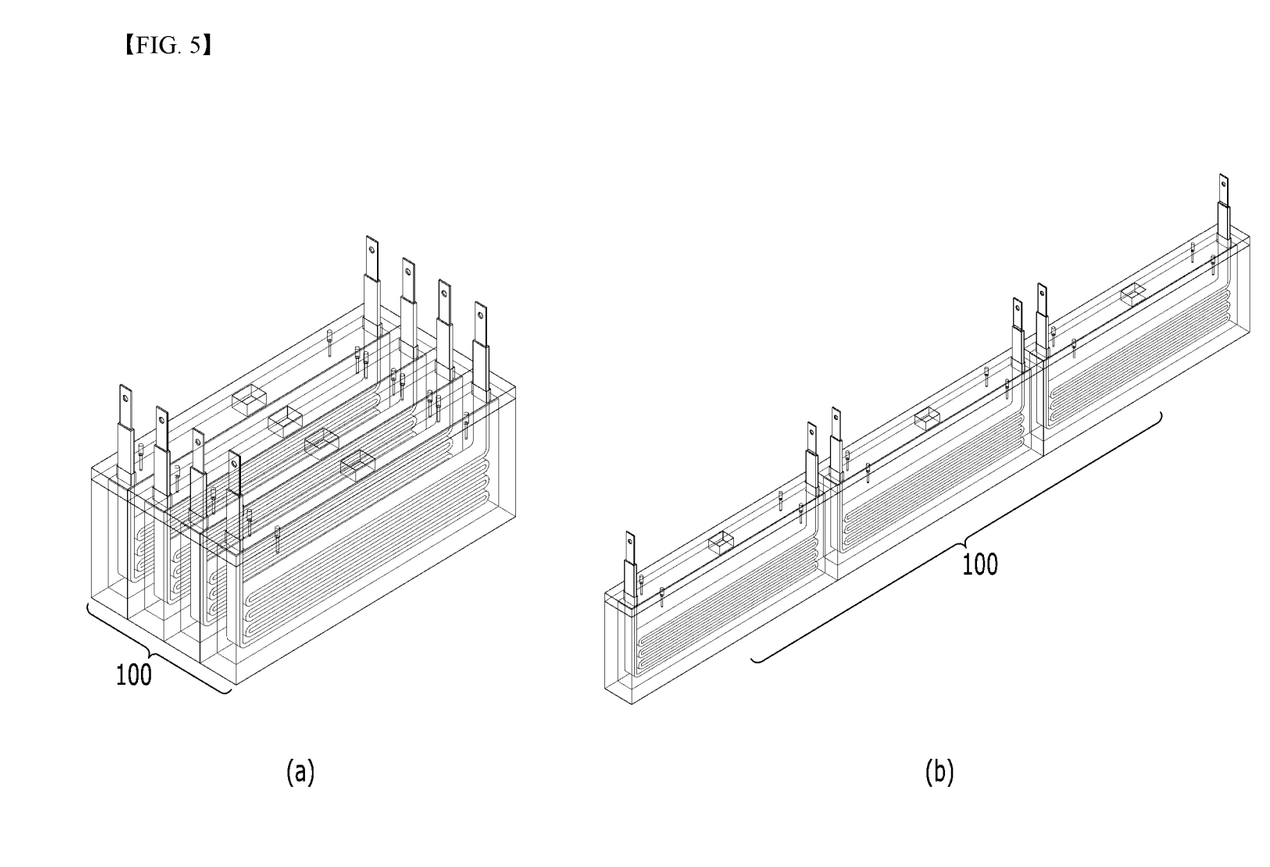
FIG. 5 is a diagram which shows a connection method of the discharge member of FIG. 2.

FIG. 5 is a diagram which shows a connection method of the discharge member of FIG. 2.

Referring to FIG. 5(a), the discharge member 100 may include a first discharge member and a second discharge member, and the first discharge member and the second discharge member may be connected to each other in parallel.

Thereby, the discharge member 100 may realize a lower resistance than the resistance of the resistor 110 included in each discharge member 100 by connecting at least two discharge members in parallel.

Further, referring to FIG. 5b, the discharge member 100 may include a first discharge member and a second discharge member, and the first discharge member and the second discharge member may be connected in series with each other.

Thereby, the discharge member 100 may realize a higher resistance than the resistance of the resistor 110 included in each discharge member 100 by connecting at least two discharge members in series.

By the above configuration, in the present embodiment, the discharge member 100 may be expanded in a parallel or series manner depending on the degree of discharging of the battery module 10, which has an advantage that the configuration of the resistance value of the discharge member 100 can be adjusted in various ways.

Figure 6:
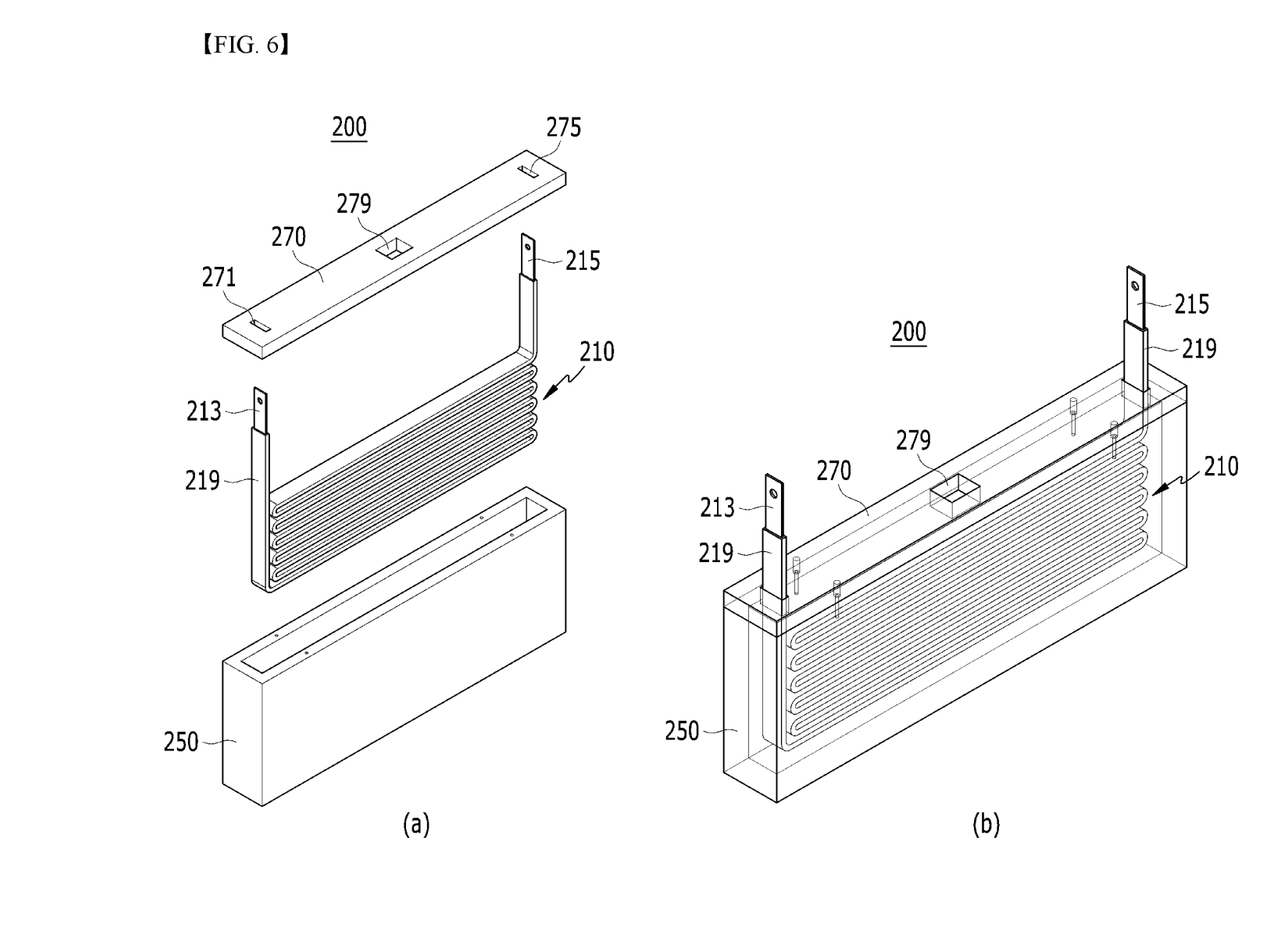
FIG. 6 is a diagram which shows a discharge member according to another embodiment of the present disclosure.

FIG. 6 is a diagram which shows a discharge member according to another embodiment of the present disclosure.

Referring to FIGS. 2 and 6, the discharge member 200 according to the present embodiment may be described in the same manner as the discharge member 100 of FIG. 2, and only the resistor 210 will be further described. Here, the resistor 110 of FIG. 2 is described as a first resistor 110, and the resistor 210 of FIG. 6 is described as a second resistor 210.

Here, the cross-sectional areas of the busbars included in the second resistor 210 and the first resistor 110 may be the same, but the lengths of the first resistor 110 and the second resistor 210 may be different. As an example, the cross-sectional areas of the busbar included in the second resistor 210 and the first resistor 110 may be the same, but the length of the second resistor 210 may be longer than the length of the first resistor 110.

In this manner, referring to FIGS. 2 and 6, the resistors 110 and 210 can adjust the length of resistors 110 and 210 and the cross-sectional area of the busbar included therein in accordance with a target resistance value. In this case, the resistors 110 and 210 may be bent relatively few or many times in accordance with the size corresponding to the internal size of the frame member 150.

More specifically, the first resistor 110 may include a busbar having the same cross-sectional area, but the length of the resistor 110 may be relatively reduced to have a relatively smaller resistance value than that of the second resistor 210. At this time, when comparing FIGS. 2 and 6, the first resistor 110 is bent less often than the second resistor

210. Thereby, the first resistor 110 may have a relatively low resistance value, and thus a discharge speed may be relatively fast.

Further, the second resistor 210 may include a busbar having the same cross-sectional area, but the length of the resistor 210 may relatively increase and thus have a relatively larger resistance value than that of the first resistor 110. At this time, when comparing FIGS. 2 and 6, the second resistor 210 is bent more times than the first resistor 110. Thereby, the second resistor 210 may have a relatively high resistance value, and thus a discharge speed may be relatively slow.

Thereby, in the present embodiment, the discharge member 100 can adjust the length of the busbar 111 and thus adjust the resistance of the resistor 110, if necessary. That is, the discharge member 100 can relatively easily adjust the resistance of the resistor 110, which thus has an advantage that the discharge time according to the capacity of the battery and the discharge performance of the discharge member 100 required in various environments can be easily adjusted.

Meanwhile, a device according to another embodiment of the present disclosure may include the battery pack described above. Such a device can be applied to a vehicle means such as an electric bicycle, an electric vehicle, or a hybrid vehicle, but the present disclosure is not limited thereto, and is applicable to various devices that can use a battery module and a battery pack including the same, which is also falls within the scope of the present disclosure.

Although preferred embodiments of the present disclosure have been described in detail above, the scope of the present disclosure is not limited thereto, and various modifications and improvements made by those skilled in the art using the basic concepts of the present disclosure, which are defined in the appended claims, also falls within the scope of the present disclosure.

DESCRIPTION OF REFERENCE NUMERALS

10: battery module
100: discharge member
110: registor
150: frame member
170: upper cover

The invention claimed is:

1. A battery pack comprising:
a battery module in which a plurality of battery cells are mounted; and
a discharge member electrically connected to the battery module,
wherein the discharge member comprises:
 a frame member having an open upper portion and containing a coolant,
 an upper cover for covering the upper portion of the frame member, and
 a resistor mounted in the frame member,
wherein ends of the resistor are exposed outside of the discharge member, and are electrically connected to the battery module, and
wherein the resistor includes a busbar and an insulating layer, and the insulating layer is formed on an outer surface of the busbar.

2. The battery pack according to claim 1, wherein:
the resistor is bent at least twice in the frame member.

3. The battery pack according to claim 1, wherein:
the central portion of the resistor is formed with an insulating layer on the outer surface of the busbar, and
ends of the resistor are formed with a power connection part in which an outer surface of the busbar is exposed.

4. The battery pack according to claim 1, wherein:
the busbar is made of copper (Cu) having a resistance of 3 mΩ or more to 50 mΩ or less.

5. The battery pack according to claim 1, wherein:
the upper cover has a first hole and a second hole formed therein, and
the ends of the resistor pass through the first hole and the second hole, respectively, and are exposed to the outside.

6. The battery pack according to claim 5, wherein:
the first hole and the second hole are respectively formed on sides of the upper cover.

7. The battery pack according to claim 5, wherein:
the upper cover is formed with a third hole that can be opened and closed.

8. The battery pack according to claim 7, wherein:
the discharge member is configured such that the coolant is injected into the frame member through the third hole.

9. The battery pack according to claim 8, wherein:
the discharge member is configured such that water vapor formed by heat generation of the resistor is discharged through the third hole.

10. The battery pack according to claim 8, wherein:
the coolant is water.

11. The battery pack according to claim 1, wherein:
the discharge member includes a first discharge member and a second discharge member, and
the first discharge member and the second discharge member are connected to each other in parallel.

12. The battery pack according to claim 1, wherein:
the discharge member includes a first discharge member and a second discharge member, and
the first discharge member and the second discharge member are connected to each other in series.

13. A device comprising the battery pack according to claim 1.

* * * * *